United States Patent [19]

Andersson

[11] Patent Number: 4,792,158

[45] Date of Patent: Dec. 20, 1988

[54] EMERGENCY LOCKING DEVICE FOR AN EXTRACTABLE STRAP IN A VEHICLE SAFETY BELT

[75] Inventor: Sture R. Andersson, Nacka, Sweden

[73] Assignee: Allied Engineering Company, Luxembourg, Luxembourg

[21] Appl. No.: 83,857

[22] PCT Filed: Oct. 24, 1986

[86] PCT No.: PCT/SE86/00491
§ 371 Date: Jul. 27, 1987
§ 102(e) Date: Jul. 27, 1987

[87] PCT Pub. No.: WO87/02630
PCT Pub. Date: May 7, 1987

[30] Foreign Application Priority Data

Oct. 25, 1985 [SE] Sweden .................... 8505045

[51] Int. Cl.$^4$ ............................................. B60R 22/36
[52] U.S. Cl. ............................. 280/806; 242/107.2; 297/480; 188/136
[58] Field of Search ................ 280/806, 801; 242/107.2; 297/480; 188/136

[56] References Cited

U.S. PATENT DOCUMENTS

| | | | |
|---|---|---|---|
| 2,071,903 | 2/1937 | Shively | 280/806 |
| 3,649,076 | 3/1972 | Blake | 280/806 |
| 3,834,496 | 9/1974 | Takada | 188/136 |
| 3,885,812 | 3/1975 | De Lavenne | 280/806 |
| 3,924,875 | 12/1975 | Lefeuvre | 280/806 |
| 4,451,062 | 5/1984 | Ziv | 280/806 |
| 4,492,348 | 1/1985 | Ziv et al. | 242/107.2 |

FOREIGN PATENT DOCUMENTS

| | | |
|---|---|---|
| 56894 | 8/1982 | European Pat. Off. . |
| 73091 | 3/1983 | European Pat. Off. . |
| 2402106 | 8/1974 | Fed. Rep. of Germany . |
| 2245249 | 1/1983 | Fed. Rep. of Germany . |
| 3624569 | 2/1987 | Fed. Rep. of Germany ...... 280/806 |
| 2226840 | 11/1974 | France . |
| 373502 | 2/1975 | Sweden . |
| 1242190 | 8/1971 | United Kingdom . |
| 1450139 | 9/1976 | United Kingdom . |

Primary Examiner—Kenneth R. Rice
Attorney, Agent, or Firm—Spencer & Frank

[57] ABSTRACT

The present invention relates to an emergency locking device for an extractable strap in a vehicle safety belt comprising a pivoted locking mechanism adapted to be moved from an idle position to a locking position in which the locking mechanism forces the strap against a rear surface, so that the strap is locked between the rear surface and the locking mechanism.

18 Claims, 3 Drawing Sheets

FIG. 6
FIG. 7
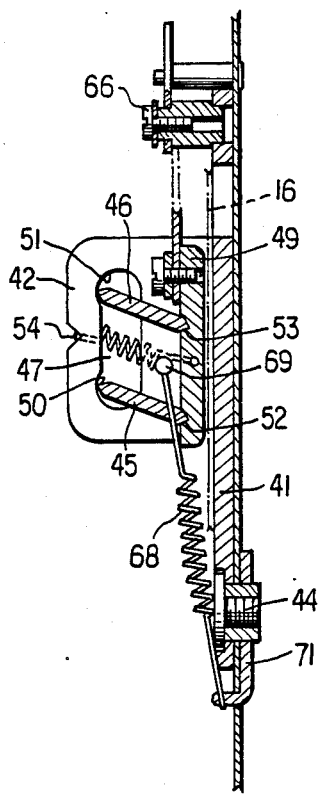
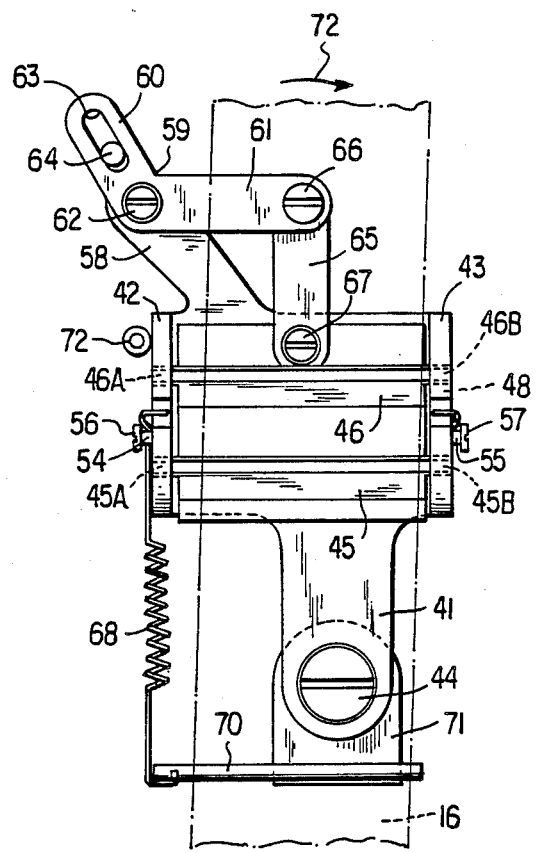

EMERGENCY LOCKING DEVICE FOR AN EXTRACTABLE STRAP IN A VEHICLE SAFETY BELT

BACKGROUND OF THE INVENTION

1. Field of the Invention

The present invention relates to an emergency locking device for an extractable strap in a vehicle safety belt comprising a pivoted locking means adapted to be moved from an idle position to a locking position in which the locking means forces the strap against a rear surface, so that the strap is locked between the rear surface and the locking means. The emergency locking device is primarily intended for use in safety belts in motor cars.

2. Discussion of the Prior Art

Vehicle safety belts with automatically retractable straps are previously known. In a safety belt of this type, the strap is wound onto a rotatably mounted shaft. The shaft is operated by a spring which is stressed when the strap is extracted, and thus can retract the strap, so that the strap is rewound onto the shaft, when the belt is not in use. A safety belt of this type is provided with a vehicle or strap sensitive means for locking the shaft, when the vehicle is being braked or turned heavily, so that the strap cannot be further withdrawn from the shaft. In this way, the person in the safety belt will be reliably restrained. However, also when the safety belt is used, normally a number of strap turns remain on the shaft. This fact entails the disadvantage that due to the so called film-roll-effect, i.e. a compression of the strap turns on the shaft, a further portion of the strap can be withdrawn from the shaft, in spite of the fact that the strap shaft is locked, when the vehicle is heavily decelerated, for example in a collision, and the person restrained in the seat belts is thrown forwardly. The portion of the strap further withdrawn can have a length of 10–15 centimeters and causes a large risk for the person restrained in the seat belt to hit a portion of the vehicle, for example the steering wheel or the windscreen.

It is previously known to provide safety belts with particular strap locking means to avoid the above mentioned disadvantage. Strap locking means of this type may comprise a turnable locking means which can be moved from an idle position to a locking position in which the locking means forces the strap against a rear surface, so that the strap is clamped between the rear surface and the locking means. The strap is caused to run either in a loop between locking rollers which can be moved to locking positions by the strap, or over a turnable locking means which can be swung into a locking position by the strap, when the strap is subject to a heavy load. A device of the last mentioned type is shown and disclosed in DE Offenlegungsschrift No. 2 420 848. These two types of prior art devices have both the disadvantage that the strap has to run over further surfaces which increase the friction when the strap is withdrawn and thus require a more powerful spring for the retraction of the strap. An increased spring force makes the safety belt more difficult to fasten and more unpleasant to wear, because the safety belt exerts a heavier pressure on the chest of the person restrained by the belt.

SUMMARY OF THE INVENTION

The main object of the invention is to provide an emergency locking dvice for an extractable strap in a safety belt, the device providing a simple and reliable locking function with a minimum of parts without any increase of the friction, when strap is being extracted.

Due to the fact that the device comprises a pendulum which swings only when the vehicle is subject to an unusually heavy deceleration, for example in a collision, and then releases the pivoted locking means which is retained in its idle position by a blocking means, so that the actuating means can move the locking means to the locking position, a fast and reliable locking function is obtained with few parts. Due to the fact that the locking means is adapted to be moved to its locking position by a particular actuating means, the strap does not have to bear on any surface of the locking means to move the locking means to its locking position. Thus, an increase of the friction during the extraction of the strap can be avoided. Due to the fact that the pivoted locking means is provided on the pendulum, the mass of the locking means is used as a pendulum mass, by which the total weight of the emergency locking device can be reduced to a minimum and the assembly of the device is facilitated. Due to the fact that the pendulum is pivoted at a point before the locking means, as seen in the direction of extraction of the strap, the advantage is achieved that the pendulum is subject to a pulling force, when the strap is loaded. This is the most favorable load for the pendulum.

BIREF DESCRIPTION OF THE DRAWINGS

The emergency locking device according to the invention will now be further described below with reference to the accompanying drawings.

FIG. 6 is a cross-sectional side view of a pendulum according to a further embodiment with a pivoted locking plate.

FIG. 7 is a front view of the pendulum as shown in FIG. 6.

BRIEF DESCRIPTION OF THE PREFERRED EMBODIMENT

Figure 1:
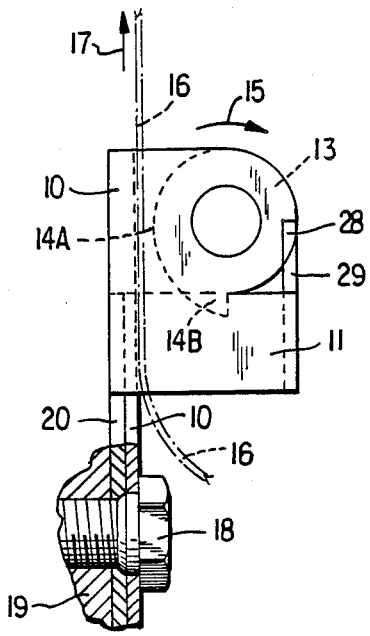
FIG. 1 is a side view of a pendulum with an eccentric-shaped locking means which is brought to its locking position by means of a spring.
Figure 2:
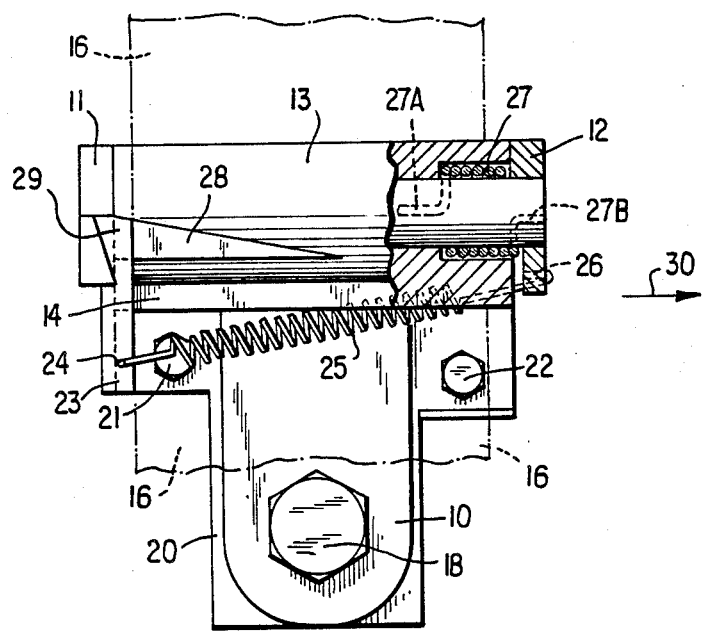
FIG. 2 is a front view, partly in section, of the pendulum shown in FIG. 1.

The pendulum shown in FIGS. 1 and 2 consists of a base plate 10, the upper portion of which has two opposite side portions 11,12 bent to a right angle, so that the upper portion of the base plate has a substantially U-shaped crosssection. An eccentric 13 is pivoted between the raised side portions 11,12, and the eccentric is provided with a projecting cam 14. The lower portion 14A of the cam does not reach the portion of the base plate 10 lying between the side portions 11,12, when the eccentric is turned clockwise. The higher portion 14B of the cam has such a height that it strikes the base plate, so that the eccentric cannot be rotated. When the eccentric 13 is turned clockwise in the direction of the arrow 15, the eccentric will be stopped, because the cam 14 strikes the base plate 10. The extractable strap 16 of the safety belt runs over the base plate 10 between the raised portions 11,12 and between the plate and the eccentric 13. The direction of extraction of the strap is indicated by the arrow 17. The lower portion of the base plate 10 is provided with a through hole for a bearing bolt 18 which is adapted to be screwed into the vehicle, for example into the B-pillar 19 of the vehicle.

The bearing bolt 18 also passes through a hole in a mounting plate 20 which is positioned behind the base plate 10, i.e. between the pendulum and the pillar 19. The mounting plate 20 is provided with two further holes for two mounting screws 21,22 which also are intended to be screwed into the pillar 19, so that the mounting plate is rigidly attached to the pillar. Furthermore, as shown in FIG. 2, the left side of the mounting plate 20 is provided with a raised portion 23 which has a hole 24 for attaching one end of a helical tensile spring 25. The other end of the spring is fastened in a hole 26 in the raised side portion 12 of the base plate 10. The purpose of the tensile spring 25 is to keep the pendulum, i.e. the base plate 10, in its idle position, in which it abuts against the raised portion 23 of the mounting plate 20.

One end of the eccentric 13 is provided with a helical spring 27 which is positioned in the eccentric along the longitudinal axis of the eccentric, as shown in FIG. 2 in the sectioned portion of the eccentric. The inner end 27A of the spring 27 is fastened in the eccentric 13 and the outer end 27B of the spring 27 is fastened in the raised side portion 12 of the base plate 10. The spring 27 is fastened and tensioned in such a way that the eccentric will turn clockwise, i.e. in the direction of the arrow 15 in FIG. 1.

The eccentric 13 is at the end opposite to the helical spring 27 provided with a bevelled surface 28. This surface is designed to abut against a protrusion 29 on the raised portion 23 of the mounting plate 20 and to form a stop surface for the eccentric, so that the eccentric cannot be turned by the helical spring 27, when the pendulum is in its idle position, as shown in FIG. 2. The bevelled surface is slanted with respect to the direction of the axis of the eccentric, so that the stop surface 28 is slanted with respect to the axis of the eccentric.

The pendulum consisting of the base plate 10 and the eccentric 13 is attached to the vehicle in such a way that the pivot axle of the pendulum, i.e. the bolt 18, is substantially perpendicular to the driving direction of the vehicle. The assumed driving direction of the vehicle is indicated in FIG. 2 by the arrow 30.

The emergency locking device according to the invention shown in FIG. 2 operates in the following way. When the vehicle is driven under normal conditions, the pendulum is in its idle position, in which the strap 16 of the safety belt runs freely between the base plate 10 and the eccentric 13. The pendulum is kept in this position by the tensile spring 25 which is so powerful that the pendulum will be kept in its idle position during normal decelerations, when the strap of the safety belt is locked by means of the normal strap and/or vehicle sensitive locking means locking the belt shaft. However, the spring 25 is not powerful enough to keep the pendulum in its idle position in an emergency situation, for example in a collision. Therefore, in such a case the pendulum will be thrown forward, i.e. in the direction indicated by the arrow 30 in FIG. 2, and will turn around its bearing bolt 18. The base plate 10 will then turn with respect to the mounting plate 20, so that the stop surface 28 of the eccentric 13 will be released from the protrusion 29 on the side portion 23 of the mounting plate. When the protrusion 29 no more abuts against the stop surface 28, the eccentric can be turned around its longitudinal axis by the spring 27. The eccentric is then rapidly turned to its locking position in which the cam 14 of the eccentric forces the strap 16 towards the base plate 10, so that the strap is clamped between the eccentric and the base plate.

Due to the fact that the stop surface 28 is slanted with respect to the longitudinal axis of the eccentric, the sliding of the stop surface on the protrusion 29 is made easier, as the friction is reduced. Furthermore, the eccentric can start turning, as soon as the base plate 10 of the pendulum starts turning with respect to the mounting plate 20, which makes the locking operation faster.

It is only necessary for the base plate 10 of the pendulum to turn a few degrees with respect to the mounting plate 20 to release the stop surface 28 from the protrusion 29. In this turning movement the strap 16 follows the base plate 10 without any difficulties, because the strap has a long, substantially vertical running length from the winding shaft of the belt, which usually is positioned at the floor of the vehicle, to a pillar loop, which normally is positioned above the back of the chair in which the person using the safety belt is sitting. The base plate 10 is raised side portions 11,12 with a certain play, as shown in FIG. 2, so that the strap can be moved sideways with respect to the base plate 10.

Before the emergency locking device can be used again, the eccentric has to be turned by hand back to its idle position, so that the actuating spring of the eccentric is tensioned, and the base plate of the pendulum has to be brought back to its start position, so that the protrusion of the mounting plate again abuts against the stop surface and the eccentric is blocked in its idle position, as shown in FIG. 1.

Figure 3:
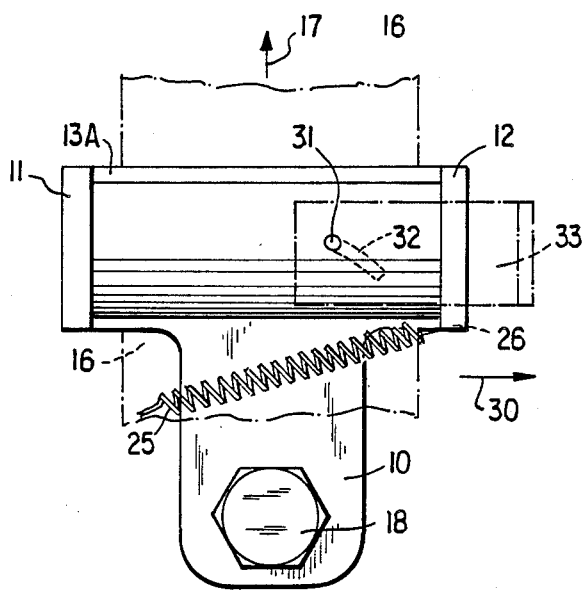
FIG. 3 is a front view of a pendulum according to another embodiment with an eccentric-shaped locking means which is brought to its locking position by a guide pin movable in a guide slot.
Figure 4:
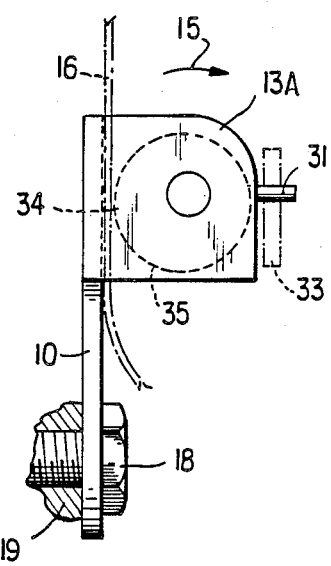
FIG. 4 is a side view of the pendulum shown in FIG. 3.

The embodiment shown in FIGS. 3 and 4 is generally in accordance with the embodiment shown in FIGS. 1 and 2. Therefore, the corresponding parts have the same reference numerals. However, the eccentric 13A is provided with a guide pin 31 which is adapted to project into a slot in a guide plate 33. The guide plate is fixed in relation to the pendulum, and the guide pin 31 is thus moved in the slot 32, when the pendulum turns from the start position shown in FIG. 3. The slot 32 is so designed that the pin 31 keeps the eccentric in its idle position, when the pin is at one end of the slot, as shown in FIG. 3, and forces the eccentric to the locking position, when the pin is moved to the other end of the slot during the turning movement of the pendulum. Thus, the guide pin 31 operates partly as a blocking means which keeps the eccentric 13A in its idle position, and partly as an actuating means which moves the eccentric to the locking position during the turning movement of the pendulum. This will provide a simplified and more reliable design, because the actuating spring 27 in the embodiment according to FIGS. 1 and 2 can be omitted. Furthermore, an automatic reset of the eccentric is obtained, when the pendulum due to the effect of the spring 25 turns back to its start position.

The guide plate 33 is shown schematically in FIGS. 3 and 4 but can preferably be designed as a portion of a mounting plate corresponding to the mounting plate 20 in the embodiment according to FIGS. 1 and 2.

The eccentric 13A is not provided with any projecting cam but consists of a cylinder which is eccentrically journalled on its pivot axle, so that the same effect is obtained as with the embodiment according to the embodiment shown in FIGS. 1 and 2. The eccentric 13A is further provided with a bevelled surface 34 running along the whole length of the eccentric and providing a larger play for the strap 16 when passing the eccentric. The eccentric is also provided with a knurl 35 on the surface intended to abut the strap in the locking position of the eccentric for a more reliable locking of the strap.

The eccentric 13 as well as the eccentric 13A are so designed that they are self-locking, i.e. so that an increase of the pulling force results in an increase of the locking force.

Figure 5:
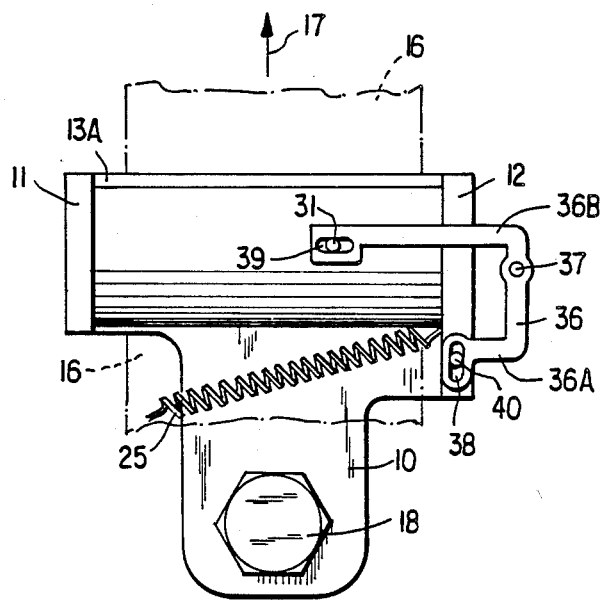
FIG. 5 shows a modification of the embodiment shown in FIG. 3 with a movable coupling link for controlling the guide pin.

The embodiment shown in FIG. 5 is in accordance with the embodiment according to FIGS. 3 and 4, apart from the fact that the guide plate 33 has been replaced by a coupling link 36 which is pivoted on a fixed shaft 37 outside the pendulum. The link has two arms 36A and 36B, the arm 36A being connected to the base plate 10 of the pendulum by means of a pin 40, which is provided on the base plate and projects into a slot 38 in the arm 36A, and the arm 36B being connected to the eccentric 13B by means of the guide pin 31 running in a slot 39 in the arm 36B. The arm 36B is longer than the arm 36A, so that the movement of the pendulum is magnified for a faster guiding of the eccentric to its locking position.

The pendulum shown in FIGS. 6 and 7 is designed and arranged in substantially the same way as the pendulums according to the previous embodiments. The pendulum consists of a base plate 41, the upper portion of which having two opposite side portions 42,43 bent to a right angle, so that the upper portion of the base plate has a substantially U-shaped cross section with two projecting flanges. The base plate 41 is pivoted on a bolt 44, which is adapted to be screwed into the vehicle. Two spacing arms 45,46 are provided between the side portions 42,43 of the base plate. The left edges of the spacing arms in FIG. 6 are provided with projecting pivots 45A,45B and 46A,46B, respectively, projecting into openings 47,48 in the side portions of the base plate. The opposite ends of the spacing arms abut against a locking plate 49. The contact surfaces of the spacing arms on the projecting pivots as well as at the locking plate are designed as knife edges bearing in V-shaped notches 50–53 in the side edges of the base plate and in the locking plate, respectively. The spacing arms 45, 46 and the locking plate 49 are retained in their positions by means of two tensile springs 54,55 positioned on the outside of the side portions 42,43 of the base plate. One end of the tensile springs 54,55 are attached to the locking plate by means of screws 56,57 and the other end of the springs are attached to the side portions of the base plate by hooking into notches in the edges of the side portions 42,43. Thus, the locking plate 49 is forced by the springs 54,55 towards the spacing arms 45,46 which in turn are forced against the outer edges of the openings 47,48, in the side portions of the base plate. With this suspension the locking plate can easily swing and move toward or away from the base plate 41.

The end of the base plate 41 turned away from the bearing bolt 44 is provided with a projecting arms 58. An angular piece 59 having two arms 60,61 is pivoted on a shaft pivot 62 at the free end of the arm 58. The pivot 62 is attached to the arm 58. One arm 60 of the angular piece 59 is provided with a slot 63 and a guide pin 64, attached to the body of the vehicle, projects into the slot. The free end of the other arm 61 of the angular piece 59 is provided with a link 65. One end of the link 65 is pivoted on a pin 66, which is attached to the arm 61, and the other end of the link is rotatably attached to the locking plate 49 by means of a bearing pin 67 attached to the locking plate.

The strap 16 extractable from the safety belt runs between the base plate 41 and the locking plate 49. The base plate 41 and thus the whole pendulum is retained in its start position by means of a powerful spring 68. One end of the spring is attached to the side portion 42 of the base plate by hooking into an opening 69 in the side portion, and the other end of the spring is attached to a projecting mounting arm 70. The arm 70 is provided on a mounting plate 71 which is rigidly fastened on the bearing bolt 44 of the base plate. The spring 68 pulls the pendulum into contact with a stop pin 72 attached to the body of the vehicle and is so powerful that the pendulum can swing from its start position shown in FIG. 7, only when the vehicle is subject to a very heavy deceleration, for example in a collision. The pendulum will then turn clockwise, as shown by the arrow 73 in FIG. 7.

The pendulum shown in FIGS. 6 and 7 operates in the following way. In case of a very heavy deceleration, the pendulum turns to the right, i.e. clockwise, in FIG. 7. The angular piece 59 is then moved on the guide pin 64, so that the arm 61 turns counter clockwise around the pin 62 and the link 65 moves the locking plate 49 upwardly. During this lifting movement the locking plate is moved towards the base plate due to the fact that the angle between the spacing arms and the locking plate increases, so that the locking plate is brought into contact with the strap 16 and forces the strap against the base plate. If the person retained by the safety belt is thrown forwards, a strong pulling force arises in the extraction direction of the strap. The locking plate 49 is then moved further upwardly and is strongly forced against the strap, so that the strap is reliably locked between the locking plate and the base plate. Thus, also in this case the locking device is self-locking.

It is important that the locking of the strap 16 occurs already for a very small turning of the pendulum. For this reason, the angular piece 59 is so designed that a magnification of the turning movement of the pendulum is provided for lifting the locking plate. Thus, the arm 61 should be as long as possible and the link 65 can preferably be connected to the locking plate at the right portion of the locking plate shown in FIG. 7.

It is very desirable that the locking plate is returned to its idle position, i.e. the start position, when the pulling force in the strap ceases. This is particularly important, when the pendulum has turned during a heavy deceleration but no collision has occured. This can be achieved by connecting the base plate and the locking plate by means of a rigid link or bar, so that the locking plate is pushed back, when the pendulum is pulled back to its start position by the powerful spring. Alternatively, a spring can be inserted between the locking plate and the support.

While only a few embodiments of the emergency locking device according to the invention have been disclosed and illustrated, it is obvious that many modifications and variations are possible within the scope of the invention. For example, it is not necessary that the locking means is an eccentric or a locking plate. It may as well consist of a pivoted arm, a sector of an eccentric or any other movable means. Essential is only that the locking means can be turned or moved from an idle position to a locking position in which the locking means forces the strap against a rear surface, so that the strap is reliably locked. A locking means in the shape of an eccentric or a locking plate, however, is most convenient, because an eccentric and a locking plate can be moved to a locking position with a minimum of elevation of the center of gravity. A rotatable arm requires a larger elevation of the center of gravity leading to the need of a more powerful actuating spring for the locking means or a larger movement of the pendulum. It is not necessary to provide the locking means on the pendulum, and the locking means may as well be arranged separately. However, it is particularly convenient to provide the locking means on the pendulum, because the mass of the locking means can then be used for the movement of the pendulum. The total weight of the emergency locking device can then be kept lower. If the locking means is not provided on the pendulum, the pendulum must be so designed that it in one way or another provides a release of the locking means during its turning movement. The spring bias of the locking means can be provided in many ways and with many different types of springs. Furthermore, it is not necessary that the pendulum is retained in its idle position by a spring. A friction bearing or a breakable pin may give a satisfying operation as well. The stop surface of the locking means and the protrusion abutting against the stop surface may also be designed in different ways. The guide pin controlling the eccentric may not necessarily be provided on the eccentric but may as well be provided on an arm which is fixed in relation to the pendulum. The guiding groove or slot may then be provided in the pendulum. In case a locking plate is used, the spacing arms can be replaced by any other type of spacing means. Alternatively, it is only necessary to provide one spacing arm, but in this case the locking plate must be guided in any other way, so that it is substantially parallel with the surface of the strap during the movement.

I claim:

1. An emergency locking device for an extractable strap of a safety belt for a vehicle having a driving direction comprising:
   a base plate;
   a pivoted locking means movable between an idle position and a locking position, said locking means not being in contact with said strap when in said idle position and forcing said strap against said base plate so that the strap is locked between said base plate and said locking means when in said locking position;
   a bearing shaft for attachment to said vehicle and disposed transverse to the driving direction thereof, said locking means being rotatable about said bearing shaft;
   a blocking means for maintaining said locking means in said idle position and being capable of being disabled so that said locking means is moved to said locking position when said locking means is rotated about said bearing shaft; and
   an actuating means for moving said locking means from said idle position to said locking position when said locking means is rotated about said bearing shaft, whereby said locking means rotates around said bearing shaft only when the vehicle is subject to a very heavy deceleration and suspends operation of said blocking means so that said locking means is released and can be moved to said locking position by said actuating means.

2. An emergency locking device as defined in claim 1, wherein said locking means includes a stop surface, said blocking means abuts against said stop surface when said locking means is in said idle position, and said actuating means comprises a spring which moves said locking means to said locking position when said locking means is released.

3. An emergency locking device as defined in claim 2, wherein said locking means has a pivot axis, and wherein said stop surface is beveled at one end of said locking means and is slanted with respect to the pivot axis.

4. An emergency locking device as defined in claim 1, wherein said blocking means and said actuating means include a guide pin and a means defining a slot having two ends, said guide pin retaining said locking means in said idle position when said guide pin is at one end of said slot defining means and moving said locking means to said locking position when said guide pin is moved to the outer end of said slot defining means, said guide pin being moved when said locking means is rotated about said bearing shaft.

5. An emergency locking device as defined in claim 4, further comprising a guide plate, wherein said guide pin is connected to said locking means and said slot defining means is provided in said guide plate, said guide plate being movable with respect to said locking means so that there is relative movement between said guide pin and said guide plate when said locking means is rotated about said bearing shaft.

6. An emergency locking device as defined in claim 4, further comprising a lever and a shaft, wherein said locking means includes a side and is connected to said lever which is pivoted on said shaft, and said shaft is disposed adjacent said locking means.

7. An emergency locking device as defined in claim 1, wherein said locking means includes a locking plate spaced from and substantially parallel with said base plate, said locking plate being pivotal towards and away from said base plate.

8. An emergency locking device as defined in claim 7, further comprising two spacing arms and said base plate including two side portions, said locking plate being mounted by said two spacing arms which are pivotally mounted to said side portions and said locking plate.

9. An emergency locking device as defined in claim 8, wherein said side portions include means defining an aperture, said spacing arms comprise plates which extend between said side portions and said locking plate, and said spacing arms extend into said aperture defining means of said side portions.

10. An emergency locking device for an extractable strap of a safety belt for a vehicle having a driving direction comprising:
    a base plate;
    a pivoted locking means movable between an idle position and a locking position, said locking means not being in contact with said strap when in said idle position and forcing said strap against said base plate so that the strap is locked between said base plate and said locking means when in said locking position;
    a bearing shaft attached to said vehicle and disposed transverse to the driving direction thereof, said base plate and said pivoted locking means comprising a pivoted part means for rotation about said bearing shaft, whereby said locking means contributes to the mass of said pivoted part means;

a blocking means for maintaining said locking means in said idle position and being capable of being disabled so that said locking means is moved to said locking position when said pivoted part means is turned; and an actuating means for moving said locking means from said idle position to said locking position when said pivoted part means is turned, whereby said pivoted part means turns around said bearing shaft only when the vehicle is subject to a very heavy deceleration and suspends operation of said blocking means so that said locking means is released and can be moved to said locking position by said actuating means.

11. An emergency locking device as defined in claim 10, wherein said locking means includes a stop surface, said blocking means abuts against said stop surface when said locking means is in said idle position, and said actuating means comprises a spring which moves said locking means to said locking position when said locking means is released.

12. An emergency locking device as defined in claim 11, wherein said locking means has a pivot axis, and wherein said surface is beveled at one end of said locking means and is slanted with respect to the pivot axis.

13. An emergency locking device as defined in claim 10, wherein said blocking means and said actuating means include a guide pin and a means defining a slot having two ends, said guide pin retaining said locking means in said idle position when said guide pin is at one end of said slot defining means and moving said locking means to said locking position when said guide pin is moved to the other end of said slot defining means, said guide pin being moved when said pivoted part means is rotated about said bearing shaft.

14. An emergency locking device as defined in claim 13, further comprising a guide plate, wherein said guide pin is connected to said locking means and said slot defining means is provided in said guide plate, said guide plate being movable with respect to said locking means so that there is relative movement between said guide pin and said guide plate when said pivoted part means is rotated about said bearing shaft.

15. An emergency locking device as defined in claim 13, further comprising a lever and a shaft, wherein said pivoted part means includes a side and is connected to said locking means by said lever which is pivoted on said shaft, said shaft being disposed on the side of said pivoted part means and said pivoted part means being configured so that the rotational movement of said locking means is magnified.

16. An emergency locking device as defined in claim 10, wherein said locking means includes a locking plate spaced from and substantially parallel with said base plate, said locking plate being pivotal towards and away from said base plate.

17. An emergency locking device as defined in claim 16, further comprising two spacing arms and said base plate including two side portions, said locking plate being mounted by said two spacing arms which are pivotally mounted to said side portions and said locking plate.

18. An emergency locking device as defined in claim 17, wherein said side portions include means defining an aperture, said spacing arms comprise plates which extend between said side portions and said locking plate, and said spacing arms extend into said aperture defining means of said side portions.

* * * * *